(12) United States Patent
Wang et al.

(10) Patent No.: US 10,821,482 B2
(45) Date of Patent: Nov. 3, 2020

(54) CLEANING DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Yong Wang, Beijing (CN); Yusheng An, Beijing (CN); Shengchao Jiang, Beijing (CN); Qingyong Meng, Beijing (CN)

(73) Assignees: BOE TECHNOLOGY GROUP CO., LTD., Beijing (CN); HEFEI BOE OPTOELECTRONICS TECHNOLOGY CO., LTD., Hefei (CN)

(*) Notice: Subject to any disclaimer, the term of this patent is extended or adjusted under 35 U.S.C. 154(b) by 149 days.

(21) Appl. No.: 16/128,889

(22) Filed: Sep. 12, 2018

(65) Prior Publication Data
US 2019/0143377 A1 May 16, 2019

(30) Foreign Application Priority Data
Nov. 15, 2017 (CN) .......................... 2017 1 1129956

(51) Int. Cl.
*B08B 1/00* (2006.01)
*B65H 18/10* (2006.01)
(Continued)

(52) U.S. Cl.
CPC ................ *B08B 1/006* (2013.01); *B08B 1/00* (2013.01); *B08B 3/08* (2013.01); *B65H 18/103* (2013.01);
(Continued)

(58) Field of Classification Search
CPC ........... A47K 7/02; A47K 7/028; A47L 13/16; A47L 13/46; A63B 57/0087; B08B 1/006;
(Continued)

(56) References Cited

U.S. PATENT DOCUMENTS 5,991,965 A * 11/1999 Stroh ................ H01L 21/67028
15/302
6,729,230 B1 * 5/2004 Okawa .................... B08B 1/008
100/102
(Continued)

FOREIGN PATENT DOCUMENTS

CN       201752712 U      3/2011
CN       202059463 U     11/2011
(Continued)

OTHER PUBLICATIONS

Notification of the First Office Action issued in Chinese Patent Application No. 201711129956.1, dated May 17, 2019; with English translation.

*Primary Examiner* — Robert J Scruggs
(74) *Attorney, Agent, or Firm* — McDermott Will & Emery LLP

(57) ABSTRACT

The cleaning device provided in the present disclosure includes a housing, the housing includes at least two housing units formed by sectioning the housing, and two adjacent housing units are detachably connected with each other. The housing is provided with a storage device, a recovery device, and a liquid-supplying device; an opening is arranged on the housing and a guide head is provided in the opening. The storage device stores a cleaning cloth, which is drawn out of the storage device and extends out of the housing via the opening, and which extends into the housing via the opening after going around the guide head and is then connected to the recovery device. The recovery device is configured to
(Continued)

draw the cleaning cloth to the recovery device to recover the cleaning cloth.

16 Claims, 6 Drawing Sheets

(51) Int. Cl.
  *B08B 3/08* (2006.01)
  *G02B 27/00* (2006.01)
  *B65H 37/00* (2006.01)
(52) U.S. Cl.
  CPC ....... *B65H 37/007* (2013.01); *G02B 27/0006* (2013.01)
(58) Field of Classification Search
  CPC .. B08B 1/00; B08B 3/08; B08B 1/003; B08B 1/002; B65H 18/103; B65H 37/007; B65H 18/00; G02B 27/0006
  See application file for complete search history.

(56) References Cited

U.S. PATENT DOCUMENTS

| | | | | |
|---|---|---|---|---|
| 2006/0048331 | A1* | 3/2006 | Rau | A47L 11/29 15/340.2 |
| 2008/0276407 | A1* | 11/2008 | Schnittman | A47L 11/34 15/319 |
| 2008/0313848 | A1* | 12/2008 | Zhang | B08B 5/02 15/405 |
| 2014/0055523 | A1* | 2/2014 | Ozaki | B41J 2/16538 347/33 |
| 2016/0041345 | A1* | 2/2016 | Kamouchi | G02B 6/3866 15/97.1 |

FOREIGN PATENT DOCUMENTS

| | | |
|---|---|---|
| CN | 202683518 U | 1/2013 |
| CN | 103611694 A | 3/2014 |
| CN | 105122108 A | 12/2015 |
| CN | 206229740 U | 6/2017 |
| CN | 206527081 U | 9/2017 |
| JP | 2013-123666 A | 6/2013 |

* cited by examiner

CLEANING DEVICE

The present application claims priority to Chinese Patent Application No. 201711129956.1, filed with the Chinese patent office on Nov. 15, 2017, titled "CLEANING DEVICE", which is incorporated herein by reference in its entirety.

TECHNICAL FIELD

The present disclosure relates to a technical field of display panel manufacturing, more particularly, to a cleaning device.

BACKGROUND

During the manufacturing of a display panel, before a pixel layer, a protective film or a polarizer is arranged on a substrate, the substrate needs to be cleaned to remove the dotted dusts on the substrate, so as to ensure the molding quality of the display panel.

SUMMARY

Some technical solutions of the present disclosure provide a cleaning device, comprising a housing, wherein the housing comprises at least two housing units formed by sectioning the housing, two adjacent housing units are detachably connected with each other, the housing is provided with a storage device and a recovery device, an opening is arranged on the housing and a guide head is provided in the opening, the storage device stores a cleaning cloth, which is drawn out of the storage device and extends out of the housing via the opening, and which extends into the housing via the opening after going around the guide head and is connected to the recovery device; the recovery device is configured to draw the cleaning cloth to the recovery device to recover the cleaning cloth.

In some technical solutions, the liquid-supplying device is configured to supply cleaning liquid to the cleaning cloth wound around guide head.

In some technical solutions, the storage device comprises a storage chamber fixed in the housing and a first reel disposed in the storage chamber, the cleaning cloth is stored in the storage chamber and is wound around the first reel; and a discharge notch is arranged on a side wall of the storage chamber, such that the cleaning cloth is drawn out of the storage chamber via the discharge notch.

In some technical solutions, a first steering rod is further arranged in the storage chamber, and the first steering rod is parallel to the first reel. Moreover, the first steering rod is arranged correspondingly to the discharge notch, such that the cleaning cloth wound around the first reel goes around the first steering rod and is then drawn out of the discharge notch.

In some technical solutions, the storage chamber comprises a first side wall and a second side wall which are arranged correspondingly to each other, such that the at least two housing units comprise a first housing unit constituting the first side wall of the storage chamber and a second housing unit constituting the second side wall of the storage chamber, one end of the first reel is connected to the first housing unit and the other end of the first reel is connected to the second housing unit, when the first housing unit and the second housing unit are detached from each other, at least one end of the first reel can be separated from the corresponding housing unit.

In some technical solutions, the first reel comprises a shaft core and a shaft sleeve, one end of the shaft core is connected to the first housing unit, and the other end of the shaft core is connected to the second housing unit, the shaft sleeve is sleeved at the shaft core and can be drawn out of an end of the shaft core, and the cleaning cloth is wound around the shaft sleeve.

In some technical solutions, a position-limiting structure is disposed between the shaft sleeve and the shaft core, and the position-limiting structure is configured to prevent the shaft sleeve from rotating relative to the shaft core.

In some technical solutions, the side wall of the storage chamber is made from an antistatic material.

In some technical solutions, the recovery device comprises a recovery chamber, a second reel, and a rotation driver, the recovery chamber is fixed in the housing, the second reel is rotationally hinged in the recovery chamber, the rotation driver is configured to drive the second reel to rotate around itself, the side wall of the recovery chamber is provided with a feed notch, such that the cleaning cloth entering the housing via the opening passes through the feed notch and is then wound around the second reel.

In some technical solutions, a second steering rod is further arranged in the recovery chamber, and the second steering rod is parallel to the second reel. Moreover, the second steering rod is arranged correspondingly to the feed notch, such that the cleaning cloth passing through the feed notch goes around the second steering rod and is then wound around the second reel.

In some technical solutions, the recovery chamber comprises a first side wall and a second side wall, the at least two housing units comprise a first housing unit constituting the first side wall of the recovery chamber and a second housing unit constituting the second side wall of the recovery chamber, one end of the second reel is connected to the first housing unit and the other end of the second reel is connected to the second housing unit, when the first housing unit and the second housing unit are detached from each other, at least one end of the second reel can be separated from the corresponding housing unit.

In some technical solutions, a groove is disposed on the side wall of the second reel, a clamping part is detachably connected in the groove, and one end of the cleaning cloth is clamped between an inner wall of the groove and the clamping part.

In some technical solutions, one end of the clamping part in the second reel is sleeved with a fastening cap, and the other end of the clamping part in the second reel limit a position by cooperation between a position-limiting shaft and a position-limiting hole.

In some technical solutions, the housing is provided with a first isolation channel located between the storage device and the opening and a second isolation channel located between the opening and the recovery device. The cleaning cloth drawn out of the storage device passes through the first isolation channel and then extends out of the housing via the opening; and the cleaning cloth going around the guide head and extending into the housing passes through the second isolation channel and is then connected to the recovery device.

In some technical solutions, the guide head is a roller rotationally hinged to the opening, and the cleaning cloth is wound around a side wall of the roller.

In some technical solutions, a plurality of the rollers are provided and they are evenly disposed at the opening in interval, the rotating axes of the plurality of rollers are collinear, and the cleaning cloth is wound around side walls of the plurality of rollers.

In some technical solutions, the liquid-supplying device comprises: a liquid storage container that stores a cleaning liquid; and a liquid-supplying pipe, one end of which is connected to the liquid storage container and the other end of which is located in a gap between two adjacent rollers.

In some technical solutions, the liquid-supplying pipe is a capillary, and side wall of the liquid storage container is made of elastic material, and the housing is provided with a through-hole; the through-hole is arranged correspondingly to the side wall of the liquid storage container, and the cleaning device further comprises a first control switch comprising a switch body, wherein the switch body is provided in the through-hole, and one end of the switch body located in the housing comes into contact with the side wall of the liquid storage container; such that when one end of the switch body located outside the housing is subjected to a pressing force, the switch body can move toward the housing to squeeze the liquid storage container.

In some technical solutions, a second control switch exposed out of the housing is further comprised, and the second control switch is configured to control to initiate the recovery device.

In some technical solutions, a cover is further comprised, wherein the cover is detachably connected to a position on the housing corresponding to the opening and covers the guide head.

BRIEF DESCRIPTION OF THE DRAWINGS

Embodiments of the present disclosure are described in detail below with reference to the accompanying drawings.

DETAILED DESCRIPTION

The embodiments described below with reference to the accompanying drawings are merely illustrative embodiments for the purpose of explaining the present disclosure, and cannot be construed as a limitation to the present disclosure.

In the description of the present disclosure, it should be understood that the directions or positional relations indicated by the terms "central", "upper", "lower", "front", "back", "left", "right", "vertical", "horizontal", "top", "bottom", "inner", and "outer" are directions or positional relations as indicated in the accompanying drawings merely for the purpose of describing the present disclosure conveniently and simplifying the description, but not for indicating or hinting that the indicated device or element must be placed in a certain direction, or constructed or operated in a specific direction; therefore, said directions or positional relations cannot be understood as a limitation to the present disclosure. In the description of the present disclosure, unless otherwise stated, "plurality" means two or more.

During the manufacturing of a display panel, the substrate needs to be cleaned, so as to ensure the molding quality of the display panel. In relevant technologies, dotted dusts on a substrate are usually cleaned by hands using a cleaning cloth in a production line. Before the substrate is wiped, to reduce the contact area between the cleaning cloth and the substrate and to prevent the cleaning cloth from being used repetitively, the cleaning cloth is usually folded into a special shape, such that the substrate is wiped using different areas of the cleaning cloth sequentially.

However, since manual operation has a low accuracy, the cleaning area folded in each wiping is still larger than the ideal area, resulting in a low utilization of the cleaning cloth. Moreover, each wiping needs dipping into the cleaning liquid that can wet a plurality of layers of the cleaning cloth, so the cleaning liquid is greatly consumed. In addition, manual dipping of cleaning liquid and changing wiping area of the cleaning cloth involve a complex operation process, resulting in a low cleaning efficiency. When the production line is busy, the cleaning cloth is often used repetitively on account that the wiping area of the cleaning cloth has not been changed in time, which not only reduces the cleaning rate of the substrate, but also brings the problem of secondary pollution.

Figure 1:
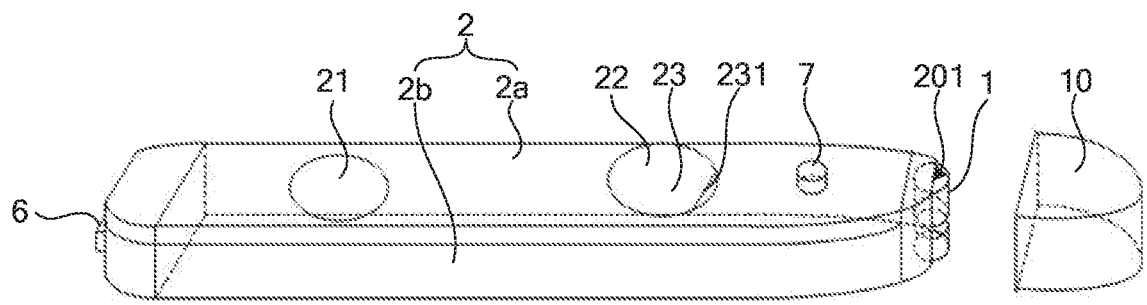
FIG. 1 is a schematic diagram of the cleaning device provided in some embodiments of the present disclosure.
Figure 2:
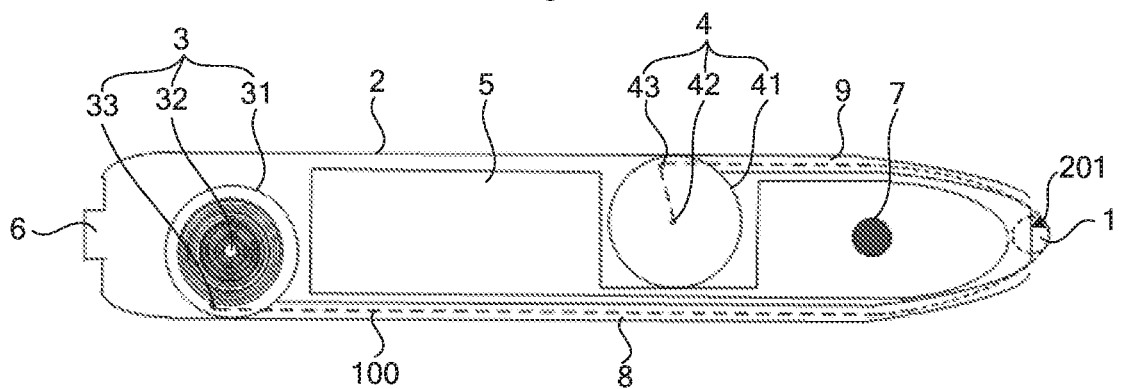
FIG. 2 is a schematic diagram illustrating the internal structure of the cleaning device provided in some embodiments of the present disclosure.

To solve the above problem, as shown in FIGS. 1 and 2, some embodiments of the present disclosure provide a cleaning device, comprising a housing 2, wherein the housing 2 comprises at least two housing units formed by sectioning the housing 2 (e.g. the housing 2 comprises two housing units 2a and 2b as shown in FIG. 1), two adjacent housing units are detachably connected with each other, the housing 2 is provided with a storage device 3 and a recovery device 4, an opening 201 is arranged on the housing 2 and a guide head 1 is provided in the opening 201, the storage device 3 stores a cleaning cloth 100, which is drawn out of the storage device 3 and extends out of the housing 2 via the opening 201, and which extends into the housing 2 via the opening 201 after going around the guide head 1 and is then connected to the recovery device 4; the recovery device 4 is configured to draw the cleaning cloth 100 to the recovery device 4 to recover the cleaning cloth 100.

As shown in FIG. 2, when the recovery device 4 is initiated, the recovery device 4 can draw the cleaning cloth 100 moving toward the recovery device 4. During this process, every area of the cleaning cloth 100 pass through the guide head 1 sequentially, thereby continuous and automatic change of wiping areas of the cleaning cloth 100 is implemented, which avoids the case that a single area of the cleaning cloth 100 is used repetitively, reduces the possibility of secondary pollution, and improves the utilization of the cleaning cloth 100 and the changing efficiency of the wiping areas.

It should be noted that the cleaning cloth 100 stored in the storage device 3 may be a wet cleaning cloth having been dipped into the cleaning liquid, or a dry cleaning cloth having not been dipped into the cleaning liquid. For a wet cleaning cloth, it does not need dipping into the cleaning liquid in use, so it can be used easily. For a dry cleaning cloth, the cleaning cloth 100 can be dipped into the cleaning liquid when it is wound around the guide head 1; since the cleaning liquid is only supplied to the cleaning cloth 100 wound around the guide head 1, the cleaning cloth 100 at the wet guide head 1 needs less cleaning liquid, which can reduce the consumption of the cleaning liquid for a single wiping.

In some embodiments of the present disclosure, continually referring to FIGS. 1 and 2, the housing 2 is further provided with a liquid-supplying device 5, wherein the liquid-supplying device 5 is configured to supply cleaning liquid to the cleaning cloth 100 wound around guide head 1. Since the liquid-supplying device 5 only supplies cleaning liquid to the cleaning cloth 100 wound around the guide head 1, and the cleaning cloth 100 at the wet guide head 1 needs less cleaning liquid, this can reduce the consumption of the cleaning liquid for a single wiping.

The housing 2 may be cylindrical, square columnar, prismatic, or spherical, which is not specifically defined here. In some embodiments, the housing 2 is a pen-like structure shown in FIG. 1 and FIG. 2, and the guide head 1 is positioned on head of the pen-like structure to facilitate hand cleaning operation.

The cleaning cloth 100 may be a synthetic fiber cloth, a natural fiber cloth, or a mixed fiber cloth formed by mixing the synthetic fiber with the natural fiber, or the like, which is not specifically defined here. In some embodiments, the cleaning cloth 100 may be a dustless cloth or a towel cloth.

The cleaning liquid may be anhydrous alcohol, water, acetone, isoacetone and so on, which is not specifically defined here.

Positions of the storage device 3 and the recovery device 4 in the housing 2 are not specifically defined, as long as the storage device 3 and the recovery device 4 cooperate in use to store and recover the cleaning cloth 100. Position of the liquid-supplying device 5 in the housing 2 is not specifically defined, as long as the liquid-supplying device 5 can supply cleaning liquid to the cleaning cloth 100 after the cleaning cloth 100 extends out of the storage device 3 and before the cleaning cloth 100 is recovered by the recovery device 4.

The housing 2 comprises at least two housing units formed by sectioning the housing 2, and two adjacent housing units are detachably connected with each other. Thereby the housing 2 can be detached to change the cleaning cloth or add cleaning liquid.

Quantity of the housing units comprised in the housing 2 may be 2, 3, 4, etc., which is not specifically defined here.

The at least two housing units may be formed by sectioning the housing 2 in a longitudinal direction or a horizontal direction, which is not specifically defined here. It should be noted that the longitudinal direction is parallel to the length direction of the housing 2, and the horizontal direction is perpendicular to the length direction of the housing 2.

Two adjacent housing units can be detachably connected with each other via a threaded connector or a buckle structure, which is not specifically defined here. However, as compared with threaded connection, the connection by a buckle structure features simple assembly and disassembly operations and a high efficiency. Therefore, to improve the maintenance efficiency of the cleaning device, in some embodiments, two adjacent housing units are connected with each other via a buckle structure.

The storage device 3 may have a plurality of structures. As an example, the storage device is a storage chamber disposed in the housing, a side wall of the storage chamber is provided with a discharge notch, and the cleaning cloth is stored in the storage chamber and is drawn out of the discharge notch. As another example, the storage device is a first reel rotationally hinged in the housing, and the cleaning cloth is wound around the first reel. Of course, the storage device may be also another structure, which is not specifically defined here, as long as it can store the cleaning cloth.

Figure 3:
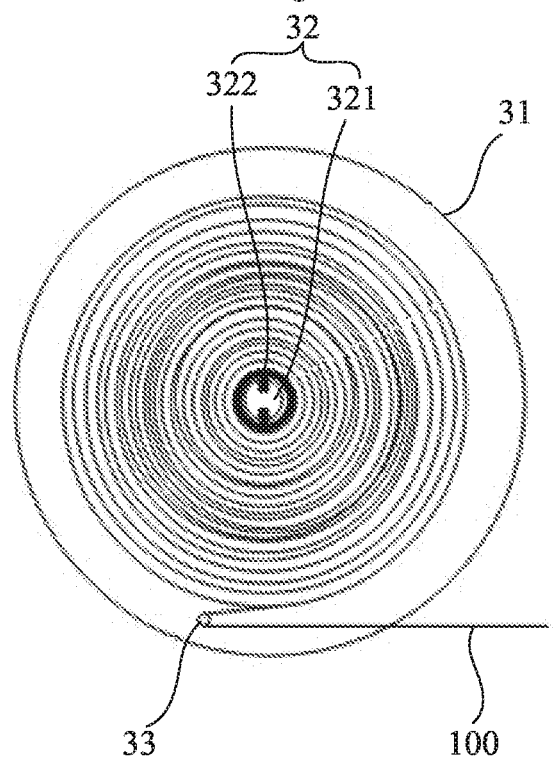
FIG. 3 is a top view of the storage device in the cleaning device provided in some embodiments of the present disclosure.
Figure 4:
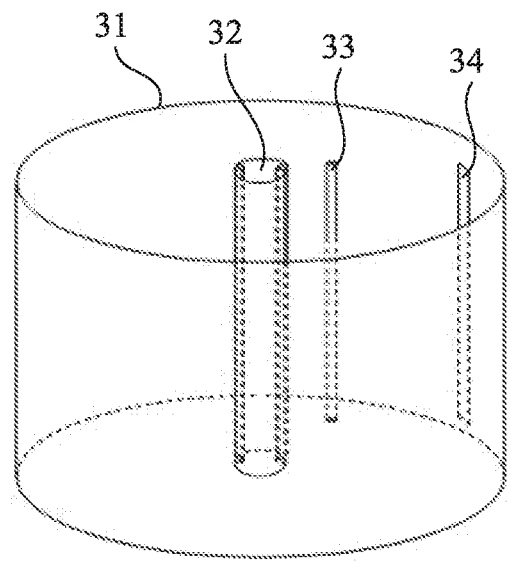
FIG. 4 is a perspective view of the storage device in the cleaning device provided in some embodiments of the present disclosure.

In some embodiments, the storage device may be a structure as shown in FIG. 3 and FIG. 4, i.e., the storage device 3 comprises a storage chamber 31 fixed in the housing 2 and a first reel 32 disposed in the storage chamber 31, the cleaning cloth 100 is stored in the storage chamber 31 and is wound around the first reel 32; moreover, a discharge notch 34 is arranged on a side wall of the storage chamber 31 (as shown in FIG. 4), and the cleaning cloth 100 is drawn out of the storage chamber 31 via the discharge notch 34. Thus, winding the cleaning cloth 100 around the first reel 32 for storage can prevent the cleaning cloth 100 from being knotted in the drawout process, and storing the cleaning cloth 100 in the storage chamber 31 can prevent dusts in the housing 2 from entering the storage chamber 31 to pollute the cleaning cloth 100.

The storage chamber 31 may be cylindrical, square columnar, or prismatic, which is not specifically defined here. However, to facilitate cleaning of the storage chamber 31 and effective utilization of the space, in some embodiments, the storage chamber 31 is cylindrical.

In some embodiments, the side wall of the storage chamber 31 is made from an antistatic material. Thus, the cleaning cloth 100 can be prevented from producing static with the side wall of the storage chamber 31 when being drawn out of the storage chamber 31.

The first reel 32 can be fixedly connected into or rotationally hinged into the storage chamber 31, which is not specifically defined here. However, when the first reel 32 is fixed in the storage chamber 32, the cleaning cloth 100 is hard to draw out of the storage chamber 31 due to a large frictional force between the cleaning cloth and the first reel 32. Therefore, to avoid this problem, in some embodiments, the first reel 32 is rotationally hinged into the storage chamber 31. Thus, when the cleaning cloth 100 is drawn out of the storage chamber 31, the first reel 32 rotates by the action of frictional force, leading to a small drawing force and a low drawing difficulty.

With the use of the cleaning cloth 100, diameter of the roll formed by the cleaning cloth 100 wound around the first reel 32 becomes smaller gradually, and the cleaning cloth 100 easy to come into contact with the edge of the discharge notch 34 to produce friction; consequently the cleaning cloth 100 is easy to be damaged by the edge of the discharge notch 34. To avoid this problem, in some embodiments, as shown in FIG. 3 and FIG. 4, a first steering rod 33 is further arranged in the storage chamber 31, and the first steering rod 33 is parallel to the first reel 32. Moreover, the first steering rod 33 is arranged correspondingly to the discharge notch 34, such that the cleaning cloth 100 wound around the first reel 32 goes around the first steering rod 33 and is then drawn out of the discharge notch 34. Thus, frictional wear between the cleaning cloth 100 and the edge of the discharge notch 34 due to gradual decrease of diameter of the roll of the cleaning cloth 100 on the first reel 32 can be avoided by the first steering rod 33.

The first steering rod 33 can be fixed into or rotationally hinged into the storage chamber 31, which is not specifically defined here. To reduce the frictional force between the cleaning cloth and the first steering rod 33, in some embodiments, the first steering rod 33 is rotationally hinged into the storage chamber 31. Thus, the friction between the cleaning cloth and the first steering rod 33 is a rolling friction, which has a small frictional force and can prevent the cleaning cloth from being worn by the first steering rod 33.

To facilitate supplementation of cleaning cloth to the storage chamber 31, in some embodiments, as shown in FIG. 2, the storage chamber 31 comprises a first side wall and a second side wall which are arranged correspondingly to each other, such that the at least two housing units comprise a first housing unit 2a constituting the first side wall of the storage chamber 31 and a second housing unit 2b constituting the second side wall of the storage chamber 31, one end of the first reel 32 is connected to the first housing unit 2a and the other end of the first reel 32 is connected to the second housing unit 2b, when the first housing unit 2a and the second housing unit 2b are detached from each other, at least one end of the first reel 32 can be separated from the corresponding housing unit. Thus, the storage chamber 31 is opened immediately after the housing 2 is disassembled, thereby the cleaning cloth can be conveniently supplemented to the storage chamber 31.

To wind the cleaning cloth around the first reel 32 in the storage chamber 31, the cleaning cloth can be directly wound around the first reel 32 in the storage chamber 31 after the housing 2 is opened, or the cleaning cloth is firstly rolled up outside the housing 2 and then the rolled up cleaning cloth is connected to the first reel 32, which is not specifically defined here. To meet the requirement of small size design of the cleaning device, space of the storage chamber 31 is usually made very small. Therefore, if winding operation is directly performed in the storage chamber 31, it will greatly increase the operation difficulty. Thus, to avoid this problem, the cleaning cloth can be firstly rolled up outside the housing 2, and then the rolled up cleaning cloth is connected to the first reel 32. To implement this operation, as shown in FIG. 3, the first reel 32 comprises a shaft core 321 and a shaft sleeve 322, one end of the shaft core 321 is connected to the first housing unit 2a, and the other end of the shaft core 321 is connected to the second housing unit 2b, the shaft core 321 is sleeved with the shaft sleeve 322 which can be drawn out of an end of the shaft core 321, the cleaning cloth 100 is wound around the shaft sleeve 322. Thus, the housing 2 can be opened after the cleaning cloth around the shaft sleeve 322 is used up. The shaft sleeve 322 is drawn out of the end of the shaft core 321, then the cleaning cloth is wound around the shaft sleeve 322 outside the housing 2, and finally the shaft sleeve 322 wound with the cleaning cloth is mounted on the shaft core 321, thereby cleaning cloth is successfully supplemented. During the supplementation, the cleaning cloth is wound outside the housing 2, which greatly reduces the operation difficulty.

To prevent relative rotation between the shaft core 321 and the shaft sleeve 322 to produce frictional wear between the shaft core 321 and the shaft sleeve 322, in some embodiments, as shown in FIGS. 5(a), 5(b), 6(a), and 6(b), a position limiting structure is disposed between the shaft core 321 and the shaft sleeve 322, and the position-limiting structure is configured to prevent the shaft sleeve 322 from rotating relative to the shaft core 321. Thus, the position limiting structure prevents relative rotation between the shaft core 321 and the shaft sleeve 322, thereby avoiding slipping between the shaft core 321 and the shaft sleeve 322 and reducing the frictional wear between the shaft core 321 and the shaft sleeve 322.

Figure 5A:
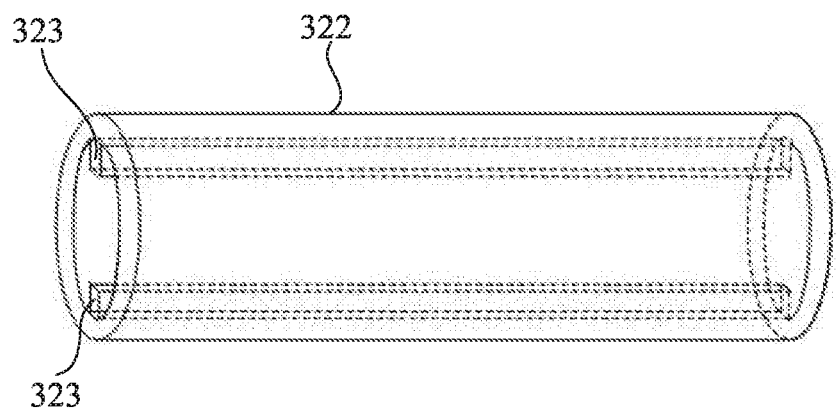
FIG. 5(a) is a perspective view of the shaft sleeve in the first reel of the cleaning device provided in some embodiments of the present disclosure.
Figure 5B:
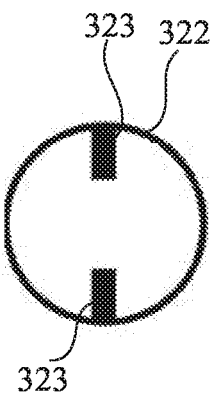
FIG. 5(b) is a schematic diagram illustrating the cross section structure of the shaft sleeve in the first reel of the cleaning device provided in some embodiments of the present disclosure.
Figure 6A:
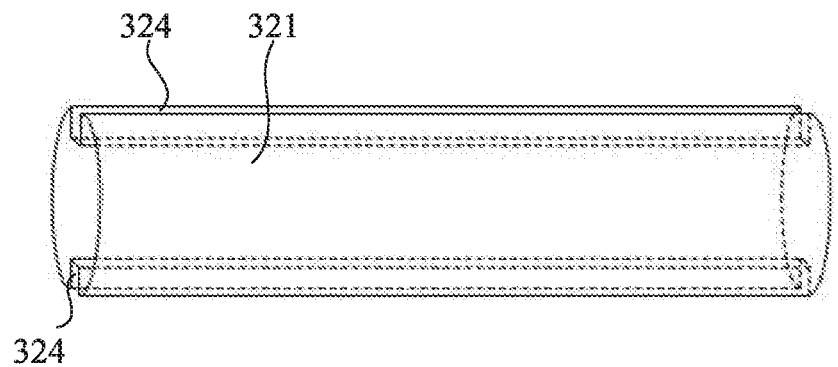
FIG. 6(a) is a perspective view of the shaft core in the first reel of the cleaning device provided in some embodiments of the present disclosure.
Figure 6B:
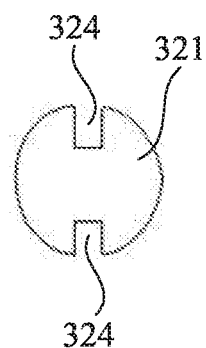
FIG. 6(b) is a schematic diagram illustrating the cross section structure of the shaft core in the first reel of the cleaning device provided in some embodiments of the present disclosure.

The position limiting structure may have many types. As an example, the position limiting structure comprises a threaded through-hole disposed on the side wall of the shaft sleeve and a set screw connected to the threaded through-hole. Front end of the set screw is abutted against the shaft core; thus the set screw limits the relative position between the shaft sleeve 322 and the shaft core 321, and prevents the shaft sleeve 322 from rotating relative to the shaft core 321. As another example, as shown in FIGS. 5(a), 5(b), 6(a), and 6(b), the position limiting structure comprises a projection 323 (as shown in FIGS. 5(a) and 5(b)) and a position limiting groove 324 (as shown in FIGS. 6(a) and 6(b)), one of the projection 323 and the position limiting groove 324 is disposed on an inner side wall of the shaft sleeve 322, and the other of the projection 323 and the position limiting groove 324 is disposed on an outer side wall of the shaft core 321. When the shaft sleeve 322 is sleeved at the shaft core 321 from an end of the shaft core 321, the projection 323 extends into the position limiting groove 324; thus the shaft sleeve 322 is prevented from rotating relative to the shaft core 321 by cooperation between the projection 323 and the position limiting groove 324.

The recovery device 4 may have a plurality of structures. As an example, the recovery device comprises a second reel and a rotating motor. The second reel is rotationally hinged in the housing. An end of the cleaning cloth is fixed on the second reel. The rotating motor is connected with the second reel and is configured to drive the second reel to rotate around itself to wind and recover the cleaning cloth on the second reel. As another example, the recovery device comprises a recovery chamber, a side wall of the recovery chamber is provided with a feed inlet, and two feed rollers are disposed at the feed inlet. The cleaning cloth is sandwiched between the two feed rollers. When the feed rollers are rotated, the cleaning cloth can be delivered to the recovery chamber. Of course, the recovery device may be also another structure, which is not specifically defined here, as long as it can draw and recover the cleaning cloth.

Figure 7:
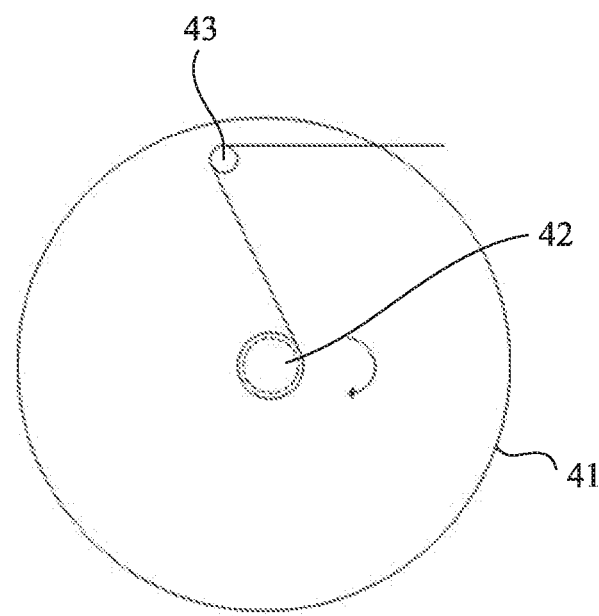
FIG. 7 is a top view of the recovery device in the cleaning device provided in some embodiments of the present disclosure.
Figure 8:
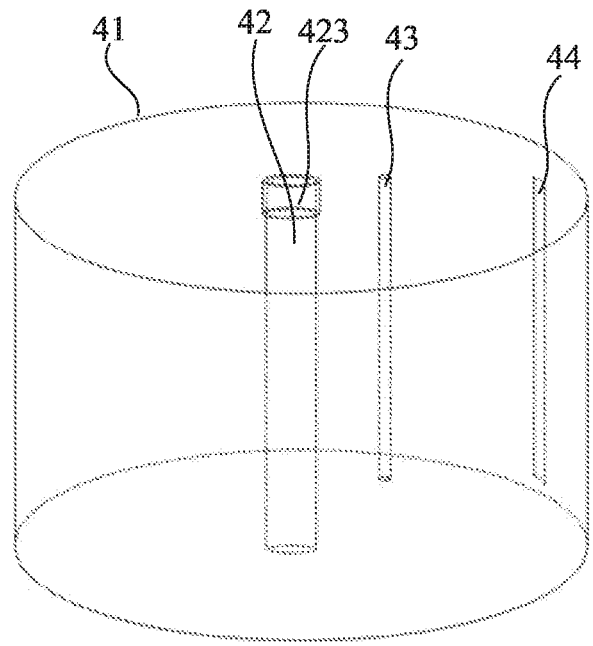
FIG. 8 is a perspective view of the recovery device in the cleaning device provided in some embodiments of the present disclosure.

In some embodiments, the recovery device 4 can be made as a structure as shown in FIGS. 7 and 8, that is, the recovery device 4 comprises a recovery chamber 41, a second reel 42, and a rotation driver (not shown in the drawings), the recovery chamber 41 is fixed in the housing 2, and the second reel 42 is rotationally hinged into the recovery chamber 41, and the rotation driver is configured to drive the second reel 42 to rotate around itself, and a feed notch 44 is provided on the side wall of the recovery chamber 41, as shown in FIG. 2, the cleaning cloth 100 entering the housing 2 via the opening 201 is wound around the second reel 42 after passing through the feed notch 44. Thus, the cleaning cloth can be recovered by driving the second reel 42 to wind the cleaning cloth with a rotation driver. This structure is simple and readily achievable. Moreover, since the cleaning cloth is recovered in the recovery chamber 41, the used cleaning cloth will not pollute other portions in the housing 2.

The rotation driver can be a rotating motor or a whole device comprising a rotating motor and a decelerator, which is not specifically defined here.

In some embodiments, the side wall of the recovery chamber 41 is made from an antistatic material. Thus, the cleaning cloth can be prevented from producing static with the side wall of the recovery chamber 41 when it enters the recovery chamber 41 via the feed notch 44.

The recovery chamber 41 may be a cylindrical chamber, a square columnar chamber, a prismatic chamber, and so on, which is not specifically defined here. To facilitate cleaning of the recovery chamber 41 and effective utilization of the space, in some embodiments, the recovery chamber 41 is a cylindrical chamber.

With the recovery of the cleaning cloth, diameter of the roll formed by the cleaning cloth wound around the second reel 42 becomes larger gradually, and the cleaning cloth is easy to come into contact with the edge of the feed notch 44 to produce friction; consequently the cleaning cloth is easy to be damaged by the edge of the feed notch 44.

To avoid this problem, in some embodiments, as shown in FIG. 7 and FIG. 8, a second steering rod 43 is further arranged in the recovery chamber 41, and the second steering rod 43 is parallel to the second reel 42. Moreover, the second steering rod 43 is arranged correspondingly to the feed notch 44, such that the cleaning cloth passing through the feed notch 44 is wound around the second reel 42 after going around the second steering rod 43. Thus, frictional wear between the cleaning cloth and the edge of the feed notch 44 due to gradual increase of diameter of the roll of the cleaning cloth on the second reel 42 can be avoided by the second steering rod 43.

The second steering rod 43 can be fixedly connected or rotationally hinged into the recovery chamber 41, which is not specifically defined here. However, to reduce the frictional force between the cleaning cloth and the second steering rod 43, in some embodiments, the second steering rod 43 is rotationally hinged into the recovery chamber 41. Thus, the friction between the cleaning cloth and the second steering rod 43 is a rolling friction, which has a small frictional force and can prevent the cleaning cloth from being worn by the second steering rod 43.

To facilitate removal of cleaning cloth in the recovery chamber 41, in some embodiments, the recovery chamber 41 comprises a first side wall and a second side wall, the at least two housing units comprise a first housing unit 2a constituting the first side wall of the recovery chamber 41 and a second housing unit 2b constituting the second side wall of the recovery chamber 41, one end of the second reel 42 is connected to the first housing unit 2a and the other end of the second reel 42 is connected to the second housing unit 2b; when the first housing unit 2a and the second housing unit 2b are detached from each other, at least one end of the second reel 42 can be separated from the corresponding housing unit. Thus, the recovery chamber 41 is opened immediately after the housing 2 is disassembled, thereby the cleaning cloth in the recovery chamber 41 can be conveniently removed.

Figure 9A:
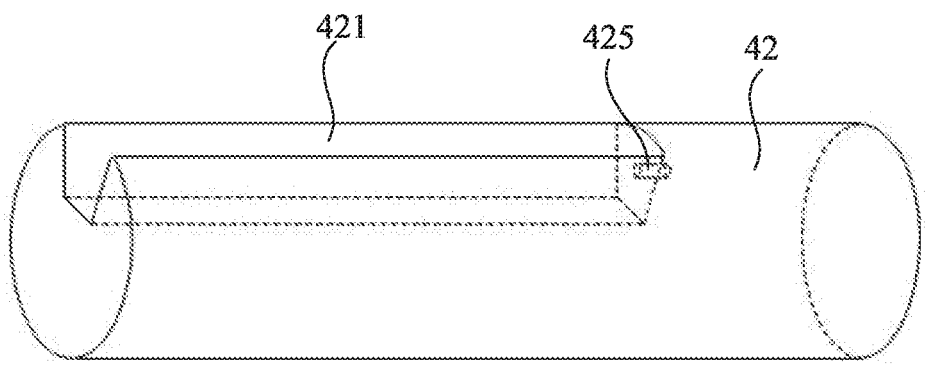
FIG. 9(a) is a schematic diagram illustrating the structure of the second reel in the cleaning device provided in some embodiments of the present disclosure.
Figure 9B:
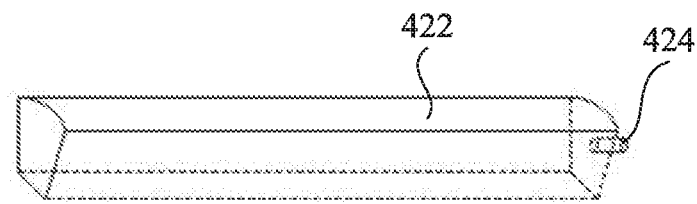
FIG. 9(b) is a schematic diagram illustrating the structure of the clamping part in the cleaning device provided in some embodiments of the present disclosure.
Figure 9C:
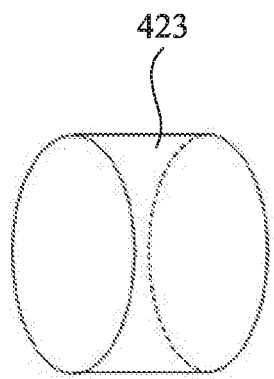
FIG. 9(c) is a schematic diagram illustrating the structure of the fastening cap in the cleaning device provided in some embodiments of the present disclosure.

To facilitate disassembly and fastening of the cleaning cloth in the recovery chamber 41, in some embodiments, as shown in FIGS. 9(a), 9(b), and 9(c), a groove 421 is disposed on the side wall of the second reel 42, a clamping part 422 is detachably connected in the groove 421, and one end of the cleaning cloth is clamped between an inner wall of the groove 421 and the clamping part 422. Thus, to take out the cleaning cloth from the second reel 42 or fix the cleaning cloth to the second reel 42, the clamping part 422 can be detached from or mounted into the groove 421 to take out or fix the end of the cleaning cloth. This structure is simple and facilitates detachment or end fastening of the cleaning cloth in the recovery chamber 41.

To implement detachable connection between the inner wall of the groove 421 and the clamping part 422, a threaded connector can be used to implement detachable connection, or a fastening cap 423, a position-limiting shaft 424, and a position-limiting hole 425 as shown in FIGS. 9(a), 9(b), and 9(c) can be used to implement detachable connection, wherein the fastening cap 423 is sleeved at one end of the clamping part 422 in the second reel 42, the position-limiting shaft 424 is disposed at the other end of the clamping part 422, and the position-limiting hole 425 is disclosed on the inner wall of the groove 421 and cooperates with the position-limiting shaft 424, which is not specifically defined here.

To prevent dusts in other regions of the housing 2 from polluting the cleaning cloth before use, and prevent the used cleaning cloth from polluting other regions of the housing 2, in some embodiments, as shown in FIG. 2, the housing 2 is provided with a first isolation channel 8 located between the storage device 3 and the opening 201 and a second isolation channel 9 located between the opening 201 and the recovery device 4. The cleaning cloth 100 drawn out of the storage device 3 passes through the first isolation channel 8 and then extends out of the housing 2 via the opening 201; moreover, the cleaning cloth 100 going around the guide head 1 and extending into the housing 2 passes through the second isolation channel 9 and is then connected to the recovery device 4. Thus, the moving space of the cleaning cloth before and after use is separated from the space of other portions in the housing 2, which can prevent dusts in the space of other portions of the housing 2 from polluting the cleaning cloth before use, and prevent the used cleaning cloth from polluting structures in the space of other portions of the housing 2.

The guide head 1 may have a plurality of structures. As an example, the guide head is a fixed shaft disposed at the opening 201, and the cleaning cloth is wound around a side wall of the fixed shaft. As another example, the guide head is a roller rotationally hinged to the opening 201, and the cleaning cloth is wound around a side wall of the roller. Of course, the guide head may be also another structure, which is not specifically defined here.

Figure 10:
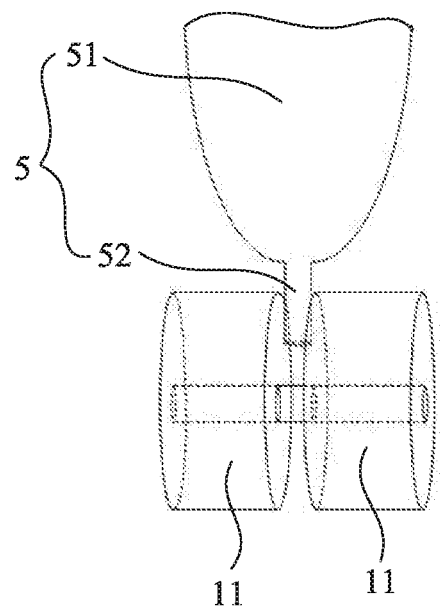
FIG. 10 is a schematic diagram illustrating the structures of the guide head and the liquid-supplying device of the cleaning device provided in some embodiments of the present disclosure.
Figure 11:
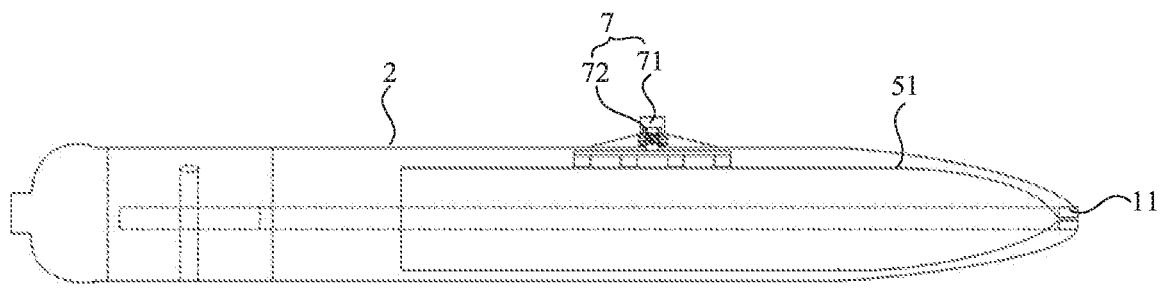
FIG. 11 is a schematic diagram illustrating the structures of the first control switch and the liquid storage container of the cleaning device provided in some embodiments of the present disclosure.

In some embodiments, the guide head 1 is made into a structure as shown in FIG. 10, that is, the guide head 1 is a roller 11 rotationally hinged to the opening 201, and the cleaning cloth is wound around a side wall of the roller 11. Thus, the friction between the guide head 1 and cleaning cloth is a rolling friction, which has a small frictional force and can reduce the wear of the cleaning cloth produced by the guide head 1.

To increase the width of the cleaning cloth that can be supported by the guide head 1, in some embodiments, as shown in FIG. 10, a plurality of the rollers 11 are provided and they are evenly disposed at the opening 201 in interval, the rotating axes of the plurality of rollers 11 are collinear, and the cleaning cloth is wound around side walls of the plurality of rollers 11. Thus, with the plurality of rollers 11 supporting the cleaning cloth, the width of the cleaning cloth that can be supported by the guide head 1 is increased, which is helpful for increasing the cover area of the guide head 1 in wiping, thereby improving the cleaning efficiency.

Quantity of the rollers 11 may be 2, 3, 4, etc., which is not specifically defined here.

The liquid-supplying device 5 may have a plurality of structures, which is not specifically defined here. In some embodiments, as shown in FIG. 10, the liquid-supplying device 5 comprises: a liquid storage container 51 that stores a cleaning liquid; and a liquid-supplying pipe 52, one end of which is connected to the liquid storage container 51 and the other end of which is located in a gap between two adjacent rollers 11. Thus, the cleaning liquid supplied by the liquid-supplying device 5 can flow onto the cleaning cloth at the guide head 1 along the gap between two adjacent rollers 11. This structure is simple and readily achievable.

Figure 12A:
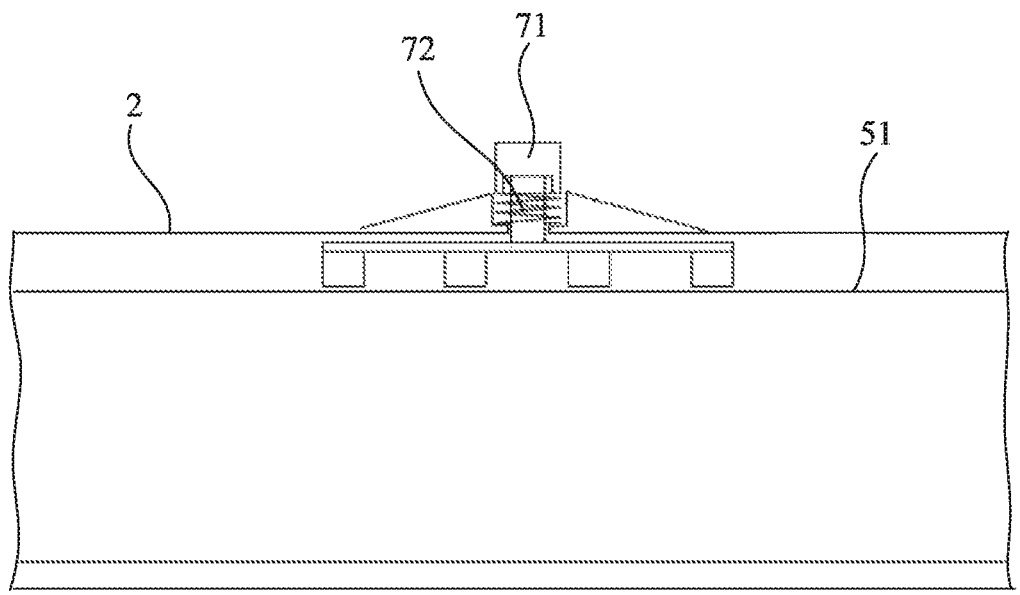
FIG. 12(a) is a structural schematic diagram illustrating a state in which the first control switch of the cleaning device provided in some embodiments of the present disclosure is closed.
Figure 12B:
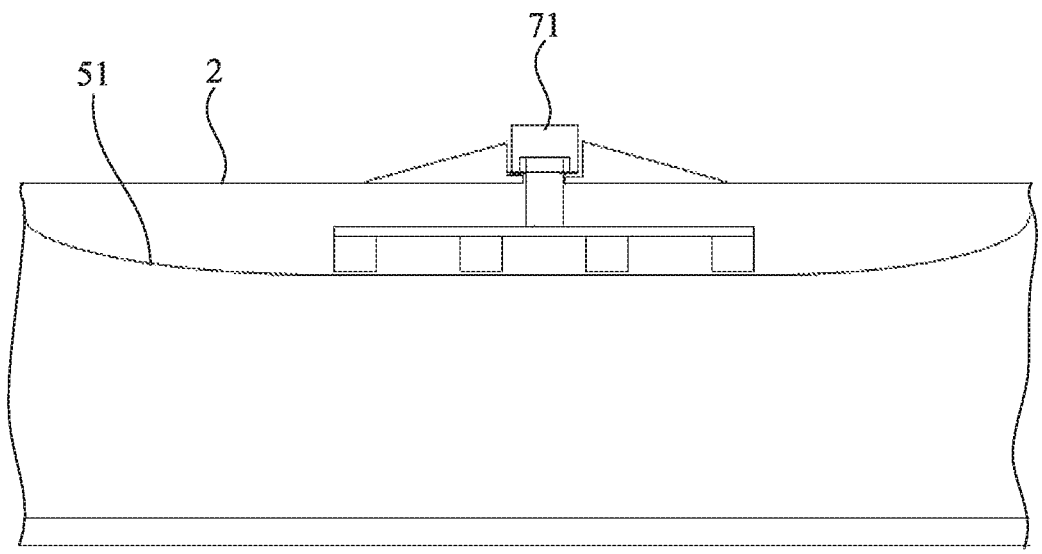
FIG. 12(b) is a structural schematic diagram illustrating a state in which the first control switch of the cleaning device provided in some embodiments of the present disclosure is initiated.

To control opening or closing of the liquid-supplying device 5, in some embodiments, as shown in FIG. 10, the liquid-supplying pipe 52 is a capillary (i.e., a pipe whose inner diameter is less than 1 mm), at this time the cleaning liquid in the liquid storage container 51 does not drop from the liquid-supplying pipe 52 under the external atmospheric pressure; side wall of the liquid storage container 51 is made of elastic material, and the housing 2 is provided with a through-hole; the through-hole is arranged correspondingly to the side wall of the liquid storage container 51, and the cleaning device further comprises a first control switch 7 comprising a switch body 71, wherein the switch body 71 is provided in the through-hole, and one end of the switch body 71 located in the housing 2 comes into contact with the side wall of the liquid storage container 51 (as shown in FIG. 12(*a*)); such that when one end of the switch body 71 located outside the housing 2 is subjected to a pressing force, the switch body 71 can move toward the housing 2 to squeeze the liquid storage container 51, resulting in concave deformation of the liquid storage container 51 (as shown in FIG. 12(*b*)), so as to squeeze out the cleaning liquid in the liquid storage container 51. After the squeezing is finished, the pressing force can be canceled, such that the switch body 71 can be restored to the initial position under the rebounding force of the liquid storage container 51, and then the next pressing operation is implemented. Thereby control over the liquid-supplying device 5 is implemented.

The liquid storage container 51 may be made of spring steel or plastic, which is not specifically defined here. Plastic is cheaper and lighter than spring steel, and therefore can reduce the cost and mass of the cleaning device.

To facilitate control and operation of the first control switch 7, in some embodiments, the first control switch 7 is disposed on the housing 2 at a position held by a user's hand, so as to facilitate user operation.

To improve the rebound speed of the switch body 71, so as to rapidly implement the next pressing operation and increase the liquid supply speed of the liquid-supplying device 5, in some embodiments, as shown in FIG. 12(*a*), the first control switch 7 further comprises an elastic reset part 72 configured to apply to the switch body 71 an elastic reset force pointing the outside of the housing 2. Thus, after the pressing force is canceled upon completion of a squeezing operation, an elastic reset force can be applied to the switch body 71 by the elastic reset part 72 to increase the reset speed of the switch body 71, thereby rapidly implementing the next pressing operation to increase the liquid supply speed of the liquid-supplying device 5.

To control opening or closing of the recovery device 4, in some embodiments, as shown in FIG. 1 or FIG. 2, the cleaning device further comprises a second control switch 6 exposed out of the housing 2 and configured to control to initiate or close the recovery device 4.

Position of the second control switch 6 is not specifically defined. As an example, as shown in FIG. 1 and FIG. 2, the second control switch 6 can be arranged on a top wall of the housing 2.

To monitor the amount of the remaining cleaning cloth in the storage chamber 31, in some embodiments, as shown in FIG. 1, the side wall of the storage chamber 31 is made of a transparent material, a position on the side wall of the housing 2 corresponding to the storage chamber 31 is provided with a first transparent window 21, or the housing 2, as a whole, is made of a transparent material. Thus, the amount of the remaining cleaning cloth in the storage chamber 31 can be monitored via the first transparent window 21 or the housing 2, so as to facilitate timely addition of the cleaning cloth.

To monitor the remaining space in the recovery chamber 41 that can accommodate the cleaning cloth, in some embodiments, as shown in FIG. 1, the side wall of the recovery chamber 41 is made of a transparent material, a position on the side wall of the housing 2 corresponding to the recovery chamber 41 is provided with a second transparent window 22, or the housing 2, as a whole, is made of a transparent material. Thus, the remaining space in the recovery chamber 41 that can accommodate the cleaning cloth can be monitored via the second transparent window 22 or the housing 2, so as to remove the cleaning cloth 100 in time.

To monitor the amount of the remaining cleaning liquid in the liquid storage container 51, in some embodiments, as shown in FIG. 1, the liquid storage container 51 is made of a transparent material, and a position on the side wall of the housing 2 corresponding to the liquid storage container 51 is provided with a third transparent window 23, or the housing 2, as a whole, is made of a transparent material. Thus, the amount of the remaining cleaning liquid in the liquid storage container 51 can be monitored via the third transparent window 23 or the housing 2, so as to add cleaning liquid in time.

Any two or all of the first transparent window 21, the second transparent window 22 and the third transparent window 23 can be connected into one window. As an example, as shown in FIG. 1, the second transparent window 22 and the third transparent window 23 are connected into one window.

To remind the user to add cleaning liquid in time, in some embodiments, as shown in FIG. 1, the third transparent window 23 is provided with a remaining-liquid reminder line 231, which can remind the user to add cleaning liquid in time.

To prevent external pollutants from polluting the cleaning cloth at the guide head 1 when the cleaning device is not in operation, in some embodiments, as shown in FIG. 1, the cleaning device further comprises a cover 10, wherein the cover 10 is detachably connected to a position on the housing corresponding to the opening 201 and covers the guide head 1. Thus, when the cleaning device is not in operation, the cover 10 can be connected to the housing 2 and covers the guide head 1, so as to prevent external pollutants from polluting the cleaning cloth at the guide head 1.

The above embodiments are merely illustrative embodiments of the disclosure, but the protection scope of the disclosure is not limited thereto. For those skilled in the art, various changes and modifications can be made therein without departing from the spirit and essence of the disclosure, which are also considered to be within the protection scope of the disclosure. Therefore, the protection scope of the present disclosure shall be determined by the protection scope of the accompanying claims.

What is claimed is:

1. A cleaning device, comprising a housing, wherein the housing comprises at least two housing units formed by sectioning the housing, the at least two housing units which are adjacent are detachably connected with each other, the housing is provided with a storage device a recovery device, a liquid-supplying device and a first control switch, an opening is arranged on the housing and a guide head is arranged in the opening, the storage device stores a cleaning cloth, which is drawn out of the storage device and extends out of the housing via the opening, and which extends into the housing via the opening after going around the guide head and is connected to the recovery device;

the recovery device is configured to draw the cleaning cloth to the recovery device to recover the cleaning cloth;

the liquid-supplying device is configured to supply cleaning liquid to the cleaning cloth wound around the guide head, wherein the liquid-supplying device comprises:

a liquid storage container that stores a cleaning liquid, wherein a side wall of the liquid storage container is made of an elastic material, and the housing is provided with a through-hole, the through-hole is arranged correspondingly to the side wall of the liquid storage container; and a liquid-supplying pipe, one end of which is connected to the liquid storage container and the other end of which is located in a gap between two adjacent rollers, wherein the liquid-supplying pipe is a capillary;

the first control switch comprises a switch body, wherein the switch body is provided in the through-hole, and one end of the switch body located in the housing comes into contact with the side wall of the liquid storage container; such that when one end of the switch body located outside the housing is subjected to a pressing force, the switch body can move toward the housing to squeeze the liquid storage container.

2. The cleaning device according to claim 1, wherein the storage device comprises a storage chamber fixed in the housing and a first reel disposed in the storage chamber, the cleaning cloth is stored in the storage chamber and is wound around the first reel; and a discharge notch is arranged on a side wall of the storage chamber, such that the cleaning cloth is drawn out of the storage chamber via the discharge notch.

3. The cleaning device according to claim 2, wherein a first steering rod is further arranged in the storage chamber, and the first steering rod is parallel to the first reel; and the first steering rod is arranged correspondingly to the discharge notch, such that the cleaning cloth wound around the first reel goes around the first steering rod and is then drawn out of the discharge notch.

4. The cleaning device according to claim 3, wherein the recovery device comprises a recovery chamber, a second reel, and a rotation driver, the recovery chamber is fixed in the housing, the second reel is rotationally hinged in the recovery chamber, the rotation driver is configured to drive the second reel to rotate around itself; and a side wall of the recovery chamber is provided with a feed notch, such that a cleaning cloth entering the housing via the opening passes through the feed notch and is then wound around the second reel.

5. The cleaning device according to claim 4, wherein a second steering rod is further arranged in the recovery chamber, and the second steering rod is parallel to the second reel; and the second steering rod is arranged correspondingly to the feed notch, such that the cleaning cloth passing through the feed notch goes around the second steering rod and is then wound around the second reel.

6. The cleaning device according to claim 4, wherein the recovery chamber comprises a first side wall and a second side wall, the at least two housing units comprise a first housing unit constituting the first side wall of the recovery chamber and a second housing unit constituting the second side wall of the recovery chamber;

one end of the second reel is connected to the first housing unit and other end of the second reel is connected to the second housing unit; and when the first housing unit and the second housing unit are detached from each other, at least one end of the second reel can be separated from the corresponding housing unit.

7. The cleaning device according to claim 6, wherein a groove is disposed on a side wall of the second reel, a clamping part is detachably connected in the groove, and one end of the cleaning cloth is clamped between an inner wall of the groove and the clamping part.

8. The cleaning device according to claim 7, wherein one end of the clamping part in the second reel is sleeved with a fastening cap, and the other end of the clamping part in the second reel limit a position by cooperation between a position-limiting shaft and a position-limiting hole.

9. The cleaning device according to claim 2, wherein the storage chamber comprises a first side wall and a second side wall which are arranged correspondingly to each other, such that the at least two housing units comprise a first housing unit constituting the first side wall of the storage chamber and a second housing unit constituting the second side wall of the storage chamber;

one end of the first reel is connected to the first housing unit and the other end of the first reel is connected to the second housing unit; and when the first housing unit and the second housing unit are detached from each other, at least one end of the first reel can be separated from the corresponding housing unit.

10. The cleaning device according to claim 9, wherein the first reel comprises a shaft core and a shaft sleeve, one end of the shaft core is connected to the first housing unit, and the other end of the shaft core is connected to the second housing unit, the shaft sleeve is sleeved at the shaft core and can be drawn out of an end of the shaft core, and the cleaning cloth is wound around the shaft sleeve.

11. The cleaning device according to claim 10, wherein a position-limiting structure is disposed between the shaft sleeve and the shaft core, and the position-limiting structure is configured to prevent the shaft sleeve from rotating relative to the shaft core.

12. The cleaning device according to claim 1, wherein the housing is provided with a first isolation channel located between the storage device and the opening and a second isolation channel located between the opening and the recovery device, such that the cleaning cloth drawn out of the storage device passes through the first isolation channel and then extends out of the housing via the opening; and the cleaning cloth going around the guide head and extending into the housing passes through the second isolation channel and is then connected to the recovery device.

13. The cleaning device according to claim 1, wherein the guide head is a roller rotationally hinged to the opening, and the cleaning cloth is wound around a side wall of the roller.

14. The cleaning device according to claim 13, wherein a plurality of the rollers are provided and they are evenly disposed at the opening in interval, rotating axes of the plurality of rollers are collinear, and the cleaning cloth is wound around side walls of the plurality of rollers.

15. The cleaning device according to claim 1, further comprising a second control switch exposed out of the housing, wherein the second control switch is configured to control to initiate the recovery device.

16. The cleaning device according to claim 1, further comprising a cover, wherein the cover is detachably connected to a position on the housing corresponding to the opening and covers the guide head.

* * * * *